United States Patent
Velamuri et al.

(10) Patent No.: US 9,122,312 B2
(45) Date of Patent: Sep. 1, 2015

(54) SYSTEM AND METHOD FOR INTERACTING WITH A COMPUTING DEVICE

(71) Applicant: Infosys Limited, Bangalore (IN)

(72) Inventors: Ravi Prasad Venkata Velamuri, Visakhapatnam (IN); Atul Gupta, Maharashtra (IN); Jagan Joguparthy, Andhra Pradesh (IN)

(73) Assignee: Infosys Limited, Bangalore (IN)

( * ) Notice: Subject to any disclaimer, the term of this patent is extended or adjusted under 35 U.S.C. 154(b) by 158 days.

(21) Appl. No.: 13/945,396

(22) Filed: Jul. 18, 2013

(65) Prior Publication Data

US 2014/0022160 A1 Jan. 23, 2014

(30) Foreign Application Priority Data

Jul. 19, 2012 (IN) ............................ 2949/CHE/2012

(51) Int. Cl.
*G06F 3/01* (2006.01)

(52) U.S. Cl.
CPC ...................................... *G06F 3/017* (2013.01)

(58) Field of Classification Search
CPC ............ G06F 3/01; G06F 3/011; G06F 3/017
See application file for complete search history.

(56) References Cited

U.S. PATENT DOCUMENTS

| 6,950,534 B2 | 9/2005 | Cohen et al. |
| 2004/0001090 A1 | 1/2004 | Brown et al. |
| 2009/0079813 A1 | 3/2009 | Hildreth |
| 2010/0306716 A1 | 12/2010 | Perez |
| 2011/0090407 A1 | 4/2011 | Friedman |
| 2013/0159939 A1* | 6/2013 | Krishnamurthi ............... 715/863 |

* cited by examiner

*Primary Examiner* — Regina Liang

(74) *Attorney, Agent, or Firm* — Marc S. Kaufman; Stephen M. Hertzler; Reed Smith LLP

(57) ABSTRACT

One or more computing devices may detect the presence of a user, determine default communication mode for communicating with the user, use the default communication mode to elicit a communicative gesture from the user, receive a signal identifying at least one communicative gesture from the user, and convert the identified communicative gestures into a command. The default communication mode may be based on the identity of the user. Alternatively, the default communication mode can be determined by using a first mode of communication to prompt the user to make a mode-selection gesture, and if a mode-selection gesture is detected from the user within a threshold period of time, setting the first mode of communication as the default communication mode. Otherwise, if no mode-selection gesture is detected within a threshold period of time, using an alternative mode of communication to prompt the user to make a mode-selection gesture.

21 Claims, 7 Drawing Sheets

SYSTEM AND METHOD FOR INTERACTING WITH A COMPUTING DEVICE

RELATED APPLICATION DATA

This application claims priority to India Patent Application No. 2949/CHE/2012, filed Jul. 19, 2012, the disclosure of which is hereby incorporated by reference in its entirety.

FIELD OF THE INVENTION

The disclosed embodiment generally relates to a system and method for interacting with a computing device. In particular, the disclosed embodiment relates to a system and method for users to interact with one or more computing devices using gestures, and to receive communications from the one or more computing devices in a communication mode that they can understand.

BACKGROUND

Illiterate and disabled users have limited access to computing devices. In the case of illiterate users, many are precluded from operating applications or sending electronic messages because so many user interfaces require an ability to read menu options, toolbars, and prompts. In many situations, a user may be literate in one or more languages, but illiterate in the language required to operate the relevant software.

In addition to illiterate users, many disabled users cannot properly operate computing devices without special equipment and/or customized software. For example, blind persons cannot view menu options or user interface elements to make a selection. People who are speech disabled, have speech disabilities, or are mute may not be able to utilize voice controls. If they are also illiterate in the language used by a particular application, speech disabled people cannot operate the device via standard menus or prompts and lack any means by which to control a computing device.

SUMMARY

A method, apparatus, and computer readable medium are disclosed which allow users of varying disabilities, illiteracies, and language skills to interact with a computing device via gesture input.

According to the disclosed embodiment, an exemplary computer-implemented method comprises receiving a signal indicating the presence of a user, determining a default communication mode for communicating with the user, using the default communication mode to elicit a communicative gesture from the user, receiving a signal identifying at least one communicative gesture from the user, and converting at least one of the identified communicative gestures into a command.

The default communication mode may be based on the identity of the user. Alternatively, the default communication mode can be determined by using a first mode of communication to prompt the user to make a mode-selection gesture, and if a mode-selection gesture is detected from the user within a threshold period of time, setting the first mode of communication as the default communication mode. Otherwise, if no mode-selection gesture is detected within a threshold period of time, an alternative mode of communication may be used to prompt the user to make a mode-selection gesture.

The first mode of communication mode can be a first language, and the alternative mode of communication can be a second language. Alternatively, or additionally, the first mode of communication or the alternative mode of communication can comprise audio communication.

The command given by the user can be a command for a computing device to relay a message to one or more other users. When the command is a command to relay a message, the computing device can relay the message to the one or more other users, receive a response to the message, and use the default communication mode to communicate the response to the user.

DETAILED DESCRIPTION

While methods, apparatuses, and computer-readable mediums are described herein by way of examples and embodiments, those skilled in the art recognize that methods, apparatuses, and computer-readable mediums for interacting with a computing device are not limited to the embodiments or drawings described. It should be understood that the drawings and description are not intended to be limited to the particular form disclosed. Rather, the intention is to cover all modifications, equivalents and alternatives falling within the spirit and scope of the disclosed embodiments. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Methods, apparatuses and computer-readable media are disclosed which enable users having varying disabilities, illiteracies, and language skills to interact with a computer system comprising one or more computing devices. The disclosed embodiment identifies an appropriate communication mode for a system including one or more computing devices to communicate with a user and then utilizes that communication mode to communicate with the user. The user can respond to the communication by making one or more gestures, which are then interpreted and translated into commands.

Overview

Figure 1:
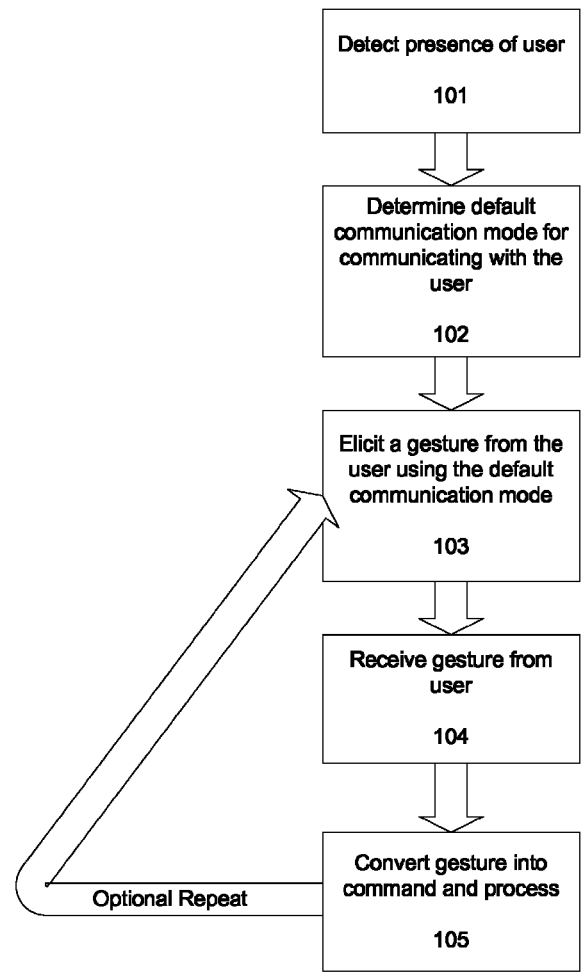
FIG. 1 is a flowchart of an exemplary method for interacting with a computer system according to the disclosed embodiment.

FIG. 1 illustrates an exemplary method according to the disclosed embodiment. The method preferably begins, in step 101, with the presence of a user being detected by the system. Then, in step 102, a default mode of communication that should be used for communicating with the user can be determined. In step 103, a gesture can be elicited from the user using the default communication mode, and gestures made by the user can be detected in step 104. Detected gestures can then be processed to determine associated commands which are processed by at least one computing device of the system in step 105. Optionally, steps 103 to 105 may be repeated as long as the user desires to continue interacting with the system.

In some situations, the system may be preconfigured to use certain communication modes. When this occurs, the step of determining a default communication mode is not needed. This could include, for example, a scenario in which the system is designed exclusively for use by a person or persons with a known disability or set of language skills. For example, the system may be preconfigured to use audio prompts to interact with a blind user.

The system may also be configured to forego the step of prompting the user for a gesture, and instead actively wait for gesture inputs from the user. For example, the system could automatically enter a "listen" state when the presence of a user is detected, and then, when detecting a gesture, proceed with translating the gesture into a command. This would be useful, for example, in a situation where the user is speech disabled and desires to have their gestures converted into an audio or textual format. The disabled user could simply continue to make gestures which would be processed by the system and converted into a message in the desired format.

Detecting the Presence of a User

The presence of a user may be detected in various ways. For example, the system may include or be communicatively coupled to a camera, video camera, infrared camera, web cam, or microphone for using images, videos, body heat, or audio to detect the presence of the user. The presence of the user could be detected via other, more conventional, input means, such as a keypad, mouse, keyboard, joystick, and the like. Alternatively, at least one of the one or more computing devices of the system could utilize a touch sensitive surface, such as a touchpad or touch screen to detect the presence of the user.

Determining the Default Mode of Communication Via Trial and Error

Figure 2:
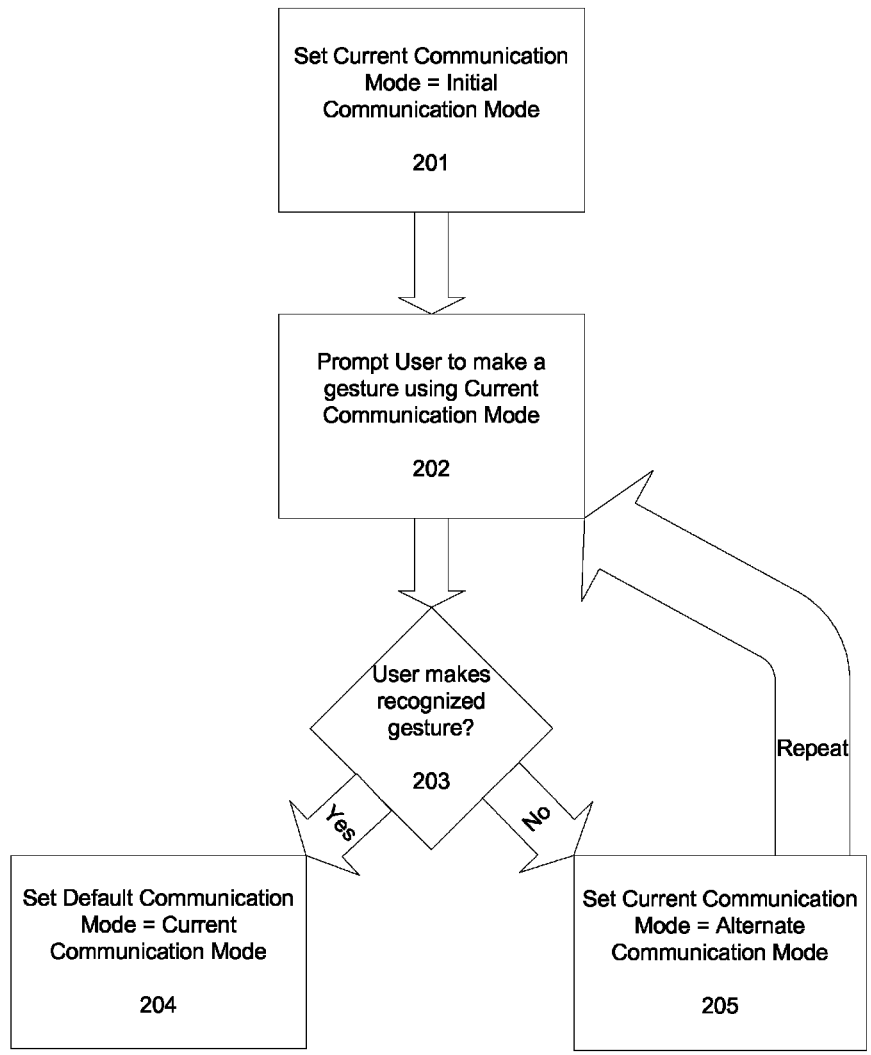
FIG. 2 is a flowchart of an exemplary method for determining a default communication mode for communication with the user according to the disclosed embodiment.

FIG. 2 illustrates a exemplary method of determining the default mode of communication for communicating with the user according to the disclosed embodiment. After the user is detected, the current communication mode can be set to an initial communication mode in step 201, and the user is prompted to make a gesture in step 202. The prompt can include directions or options relating to which gesture to make. For example, a computing device could begin to speak out or display the names of languages and a corresponding gesture to identify which one the user is comfortable with. In addition, the prompt could include displaying pictures representing a set of options along with outputting audio conveying the same options, for example, in alternating patterns. The mode of communication used is not limited to the specific examples discussed above and can be any type of communication which can be produced by a computing device.

At step 203, it can be determined whether the user makes a gesture in response to the prompt. If the user makes a recognizable gesture, it means that the user understands the current communication mode, and the default communication mode can then be set to the current communication mode in step 204. On the other hand, if no gesture is made after a threshold period of time, it likely means that the user does not understand the current communication mode. In this case, the current communication mode is set to an alternate communication mode in step 205, and the process is repeated starting at step 202 with the system once again prompting the user to make a gesture using the current communication mode. By repeating this process with different communication modes, the system can accurately identify a communication mode that can be used by the user.

Determining the Default Mode of Communication Via Identification

Figure 3:
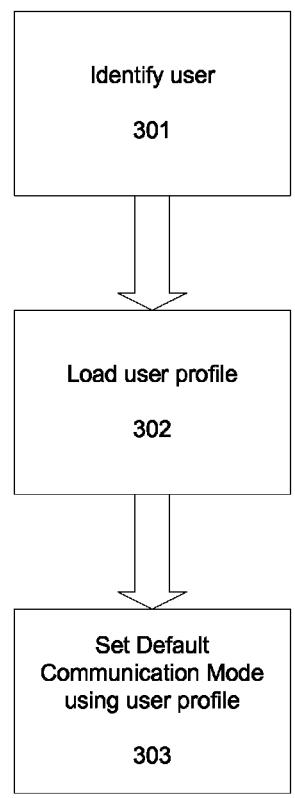
FIG. 3 is a flowchart of an alternative exemplary method for determining a default communication mode for communication with the user according to the disclosed embodiment.

FIG. 3 shows another exemplary process flow for determining the default mode of communication. The user is first identified at step 301. Various techniques can be used for identification of the user. For example, a camera or video camera can be used to capture an image of the user and facial recognition algorithms can be used to identify the user from a database of known users. Alternatively, voice recognition or other biometric means, such as a fingerprint or retinal scanner, can be used. The user information could also be entered into the system via conventional means, such as a keyboard. One skilled in the art will appreciate the different methods that can be used to provide user identification to a computer system.

After the user is identified, the user's profile is loaded in step 302. The profile may be created by the user when they first use the system or alternatively may be created automatically by the application for every user. In step, 303, the user profile can be used to load the user's preferred communication mode and set that to the default communication mode. The user's preferred communication mode may be set by the user, or may be inferred by the system, based on historic usage.

Eliciting a Gesture from the User

After the default mode of communication has been determined for the user, a gesture can be elicited from the user, for example, by presenting a menu or set of options to the user using the default mode of communication. Along with the menu or options, information can also be presented to the user indicating which gestures the user can make to select one of the options or choices. Alternatively, or in addition to a menu, the user can be asked a set of yes or no questions and select an answer using a corresponding gesture.

Furthermore, the system may wait for a user gesture or series of gestures without actively prompting the user. Typically, this begins with the system indicating to the user that it is ready to receive gestures via one or more signals such as a sound, graphic, or using the default mode of communication. After giving the indication, the system can be put into a listening mode, where it waits for user gesture input. When the user desires to utilize the application, they may make a gesture which is detected by a detection device associated with the system. The user may make a series of consecutive gestures before indicating that they are finished with a termination gesture or a pause, and the system can be configured to receive any number of gestures simultaneously.

Converting Gestures into Commands

Figure 4:
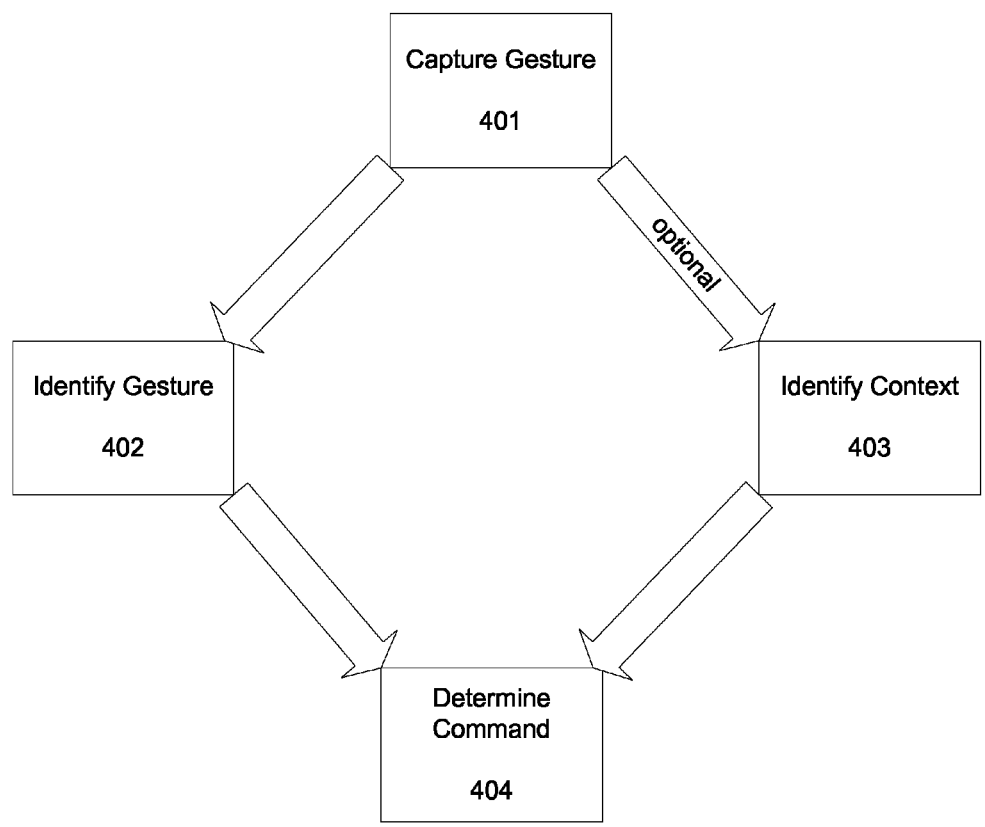
FIG. 4 is a flowchart of an exemplary method for converting a gesture into a command according to the disclosed embodiment.

FIG. 4 illustrates a flowchart for an exemplary method for converting user gestures into commands. After the gesture is captured in step 401, it is identified in step 402 using a look up function. A gesture database which is communicatively coupled to the one or more computing devices, or stored locally on the one or more computing devices, can store the various gestures and their corresponding commands. The information stored in the gesture database can be used, in step 404, to determine the appropriate command or commands corresponding to the gesture.

Optionally, the context in which the gesture was made can also be used to determine the appropriate command, 403. The contextual information used to identify the command corresponding to a gesture can relate to the specific application being used, the specific user or user profile, a specific situation or scenario within in an application or program being used, or a specific person whom the user is communicating with. For example, the same gesture may be mapped to a different command depending on whether the application is a ticket booking app, or a messaging program or an ATM interface.

Modes of Communication

The different possible modes of communication used to communicate with the user may correspond to different languages. So where the default mode of communication is determined by trial and error, the system may first ask the user to make a gesture in English. If the user is unresponsive, the system may continue to repeat the command in a different language until the user responds with a gesture.

In addition to, or in place of, different languages, the modes of communication used to communicate with a user may correspond to different types of output devices. For example, a first attempt to communicate with the user may comprise displaying a set of options in the form of pictures displayed along with corresponding gestures. If the user is unresponsive, the next attempt may switch to audio and speak the same set of choices to the user and verbally inform the user of the gestures corresponding to each of the choices.

Gesture Based Messaging

Figure 5:
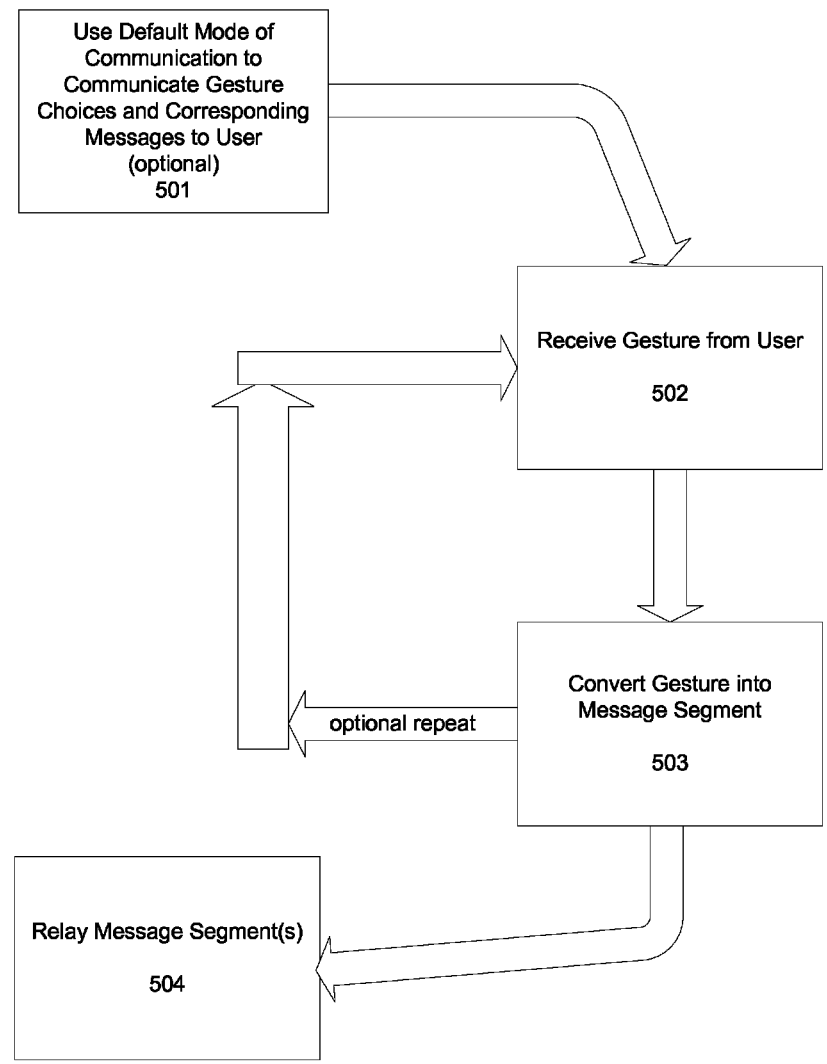
FIG. 5 is a flowchart of an exemplary method for using a gesture based interaction method to compile and send a message according to the disclosed embodiment.

The interaction method may be used to allow users to communicate messages using only gesture inputs. FIG. 5 demonstrates how this feature would operate. In optional step 501, a computing device could use the default mode of communication to communicate a series of gesture choices to the user. The gesture choices could be communicated with a corresponding indicator of the message that each gesture represents. For example, a monitor or other display device could show a graphic of multiple different hand gestures and messages which correspond to each gesture, similar to sign language. Alternatively, speakers coupled to at least one of the computing devices of the system could tell the user which gesture to make if they wish to communicate a certain phrase, word, or alphanumeric letter. Step 501 can also be skipped entirely in some scenarios, and the system can just wait to receive a gesture from the user. This may be useful when the user is already familiar with the gesture-to-message correspondence and does not need to be reminded of her options.

After receiving the gesture from the user in step 502, the gesture is converted into a message or a message segment in step 503. As previously indicated, this message segment can be a single letter, or a word, or a couple of sentences. The message segment can be a preconfigured template such as a certain type of letter or email communication. The step of receiving a gesture from the user and converting that gesture into a message segment may then optionally be repeated until the user completes their intended message. This may be useful when the gestures are based on sign language and the user would like to communicate a lengthy message by making a series of gestures at one time before communicating the message.

After the message segments are created, they can be relayed to another user or one or more other computing devices in step 504. The actual message itself may take any form, including an email, a text message, a picture or picture message, a document attached to an email, a voice message, a sound which is output from speakers connected to at least one of the one or more computing devices, or any other communication method.

Users could interact with at least one of the one or more computing devices through gestures and the at least one computing device could additionally communicate messages to guide them. The user can be guided to construct messages to be sent to another person using guidance given in the default mode of communication. A blind or an illiterate user could then assemble a message with the help of the one or more computing devices by using only gestures.

Communication Between Users

Figure 6:
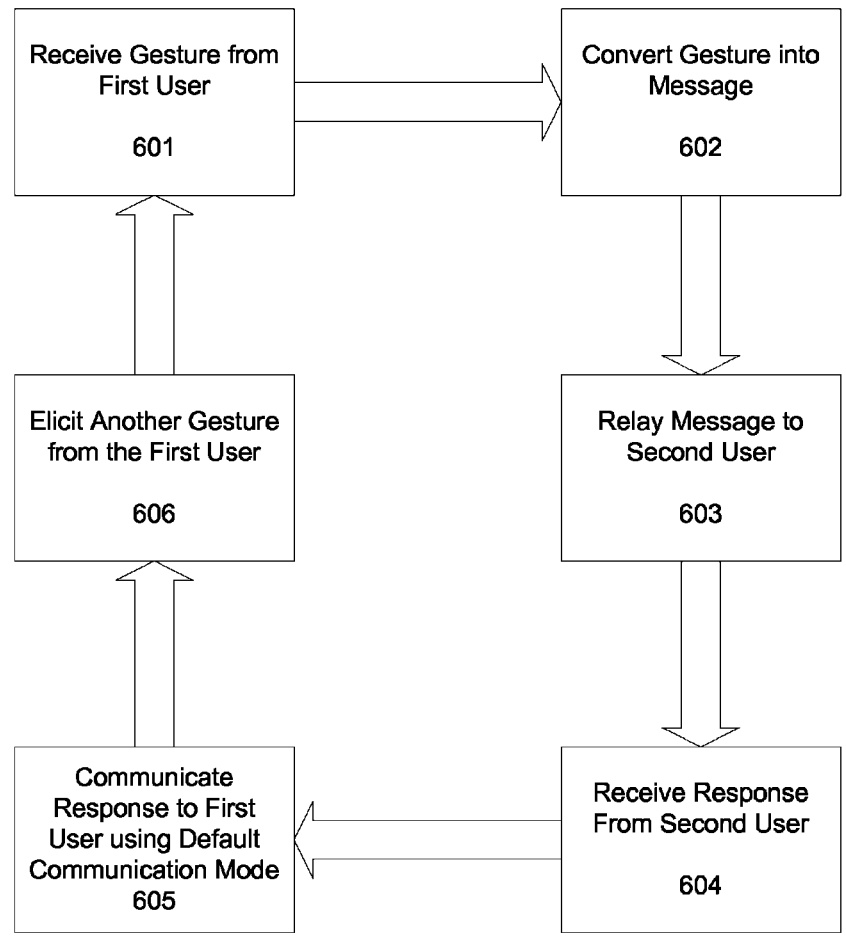
FIG. 6 is a flowchart of an exemplary method for using the gesture based interaction method to interact with another user according to the disclosed embodiment.

The interaction method can be used to establish and conduct communication between users. FIG. 6 illustrates the operation of this feature. The first three steps of the method of FIG. 6 are similar to the steps of FIG. 5. A gesture is received from a user, 601, the gesture is converted into a message, 602, and the message is relayed to a second user, 603.

After the message is relayed, one or more computing devices may receive a response from the second user, 604. The response may take the form of an email, a text message, a picture or picture message, a document attached to an email, a voice message, or a sound which is recorded by a microphone coupled to the one or more computing devices. This response can then be communicated to the user using the default communication mode in step 605. After the user receives the response, another gesture can be elicited from the user in step 606. The eliciting step can take the forms discussed above, such as by presenting a set of options or simply by going into a listen state and waiting for the user to make a gesture.

Since these steps can continue indefinitely, the method can be used to allow users who would not otherwise be able to communicate with one another to carry on a conversation. In some scenarios, the users could be in the same room. For example, in the case of a disabled user who is illiterate and cannot speak, various gestures can be mapped to prerecorded audio messages. As the users friends or relatives come into a room where the user is sitting, the mute user makes a gesture and an appropriate message is spoken out which is understood by the guest. The guest could speak out the response or type a response, based on which the mute user can make another gesture and the corresponding prerecorded audio message would be played. The same gesture could be used to communicate different audio messages based on the guest who has come in, time of the day, month of year, etc.

The users could also be located in remote locations and communicate over a network. Users could communicate across language barriers by setting the default mode of communication for each of their computing devices to two different languages. Additionally, more than one user may be disabled so that users with different disabilities or impairments to could communicate with one another, such as a scenario where an illiterate mute user could communicate with a blind user.

Application Environments

There are a number of possible applications which could utilize the gesture based control methods and systems described herein. Applications such as flight, bus or railway ticket booking applications, reservation systems, ATM interfaces, messaging software, and many others. The gesture based control method could be used to provide easy access to different commands corresponding to multiple applications. For example, a blind user could make a gesture to which the system responds with the current time of day. He could make another gesture and learn the weather, or launch a web browser. The system could also inform him if there are people in the vicinity and prompt for another gesture. The possible applications are not limited to the examples specifically disclosed herein.

Computing Environment

Figure 7:
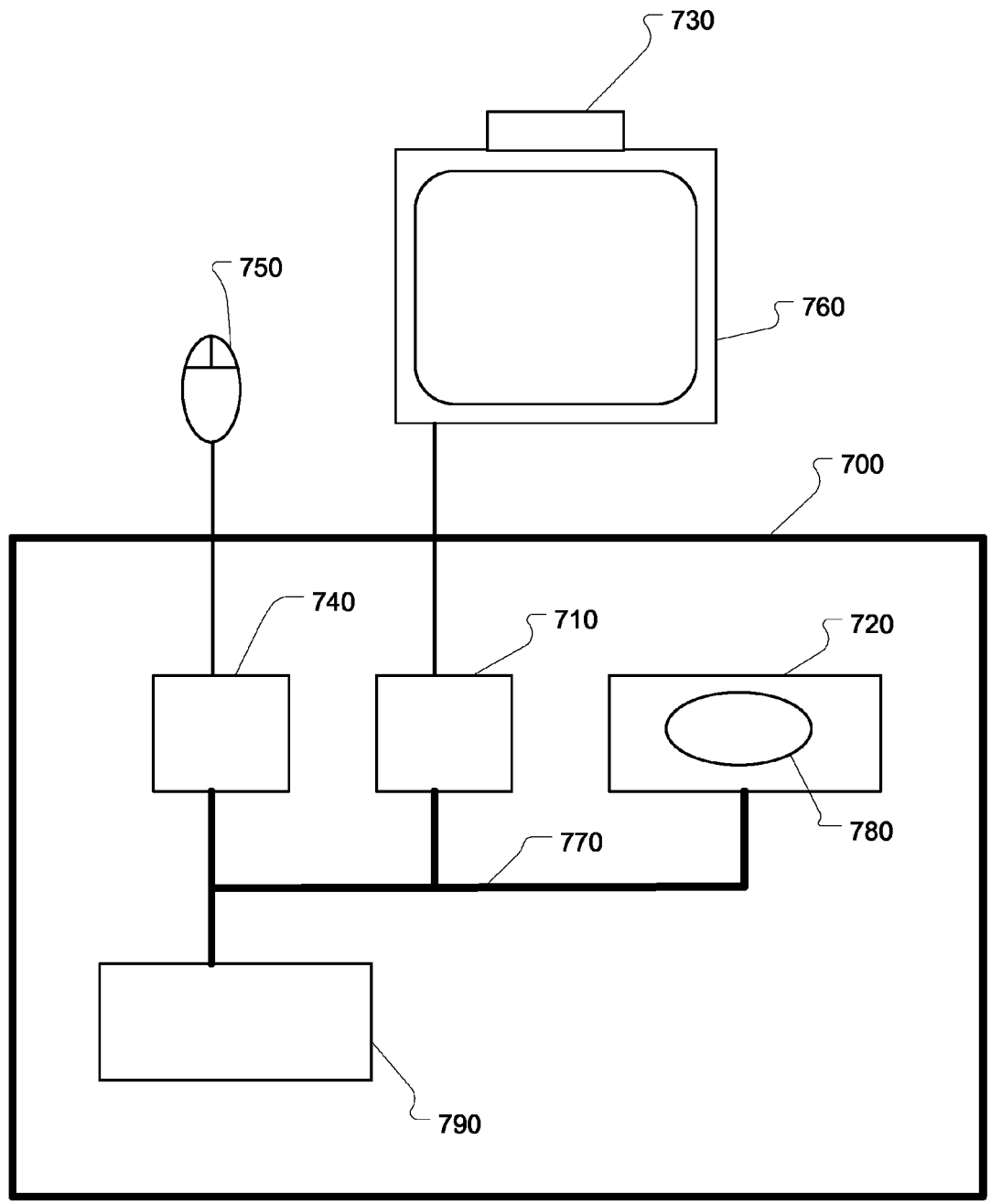
FIG. 7 shows an exemplary computing environment useful for implementing apparatuses and computer readable media, and performing methods according to the disclosed embodiment.

One or more of the above-described techniques can be implemented in or involve one or more computer systems. FIG. 7 illustrates a generalized example of a computing environment 700. The computing environment 700 is not intended to suggest any limitation as to scope of use or functionality of described embodiments.

With reference to FIG. 7, the computing environment 700 includes at least one processing unit 710 and memory 720. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. In some embodiments, the memory 720 stores software 780 implementing described techniques.

A computing environment may have additional features. For example, the computing environment 700 includes storage 740, one or more input devices 750, one or more output devices 760, and one or more communication connections 790. An interconnection mechanism 770, such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, printer, speaker, or another device that provides output from the computing environment 700.

An image capture device 730 may be a camera, video camera or any other similar device which can be used to track and record user gestures. The camera or video camera could be based on any known technologies including thermal, infrared, acoustic or other camera technologies. In one exemplary embodiment, the image capture device 730 can be a device that has gesture recognition and motion detection capabilities built into it, such as an xbox kinect console, or other similar device.

The communication connection(s) 790 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Of course, FIG. 7 illustrates computing environment 700, display device 760, image capture device 730, and input device 750 as separate devices for ease of identification only. Computing environment 700, display device 760, image capture device 730, and input device 750 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 700 may be one or more servers, for example a farm of networked servers, a clustered server environment, or a cloud network of computing devices.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method for interacting with one or more computing devices, comprising:
   receiving, by at least one of the one or more computing devices, a signal indicating the presence of a user;
   determining, by at least one of the one or more computing devices, a default communication mode for communicating with the user, the default communication mode comprising:
      using a first mode of communication to prompt the user to make a mode-selection gesture;
      if a mode-selection gesture is detected from the user, setting the first mode of communication as the default communication mode; and
      if no mode-selection gesture is detected, using an alternative mode of communication to prompt the user to make a mode-selection gesture;
   using, by at least one of the one or more computing devices, the default communication mode to elicit a communicative gesture from the user;
   receiving, by at least one of the one or more computing devices, a signal identifying at least one communicative gesture from the user; and
   converting, by at least one of the one or more computing devices, at least one of the identified communicative gestures into a command.

2. The method of claim 1, wherein the default communication mode is determined based on the identity of the user.

3. The method of claim 1, wherein
   the first mode of communication is set as the default communication mode if a mode-selection gesture is detected from the user within a threshold period of time; and
   wherein the alternative mode of communication is used to prompt the user to make a mode-selection gesture if no mode-selection gesture is detected within the threshold period of time.

4. The method of claim 1, wherein the first mode of communication comprises a first language, and the alternative mode of communication comprises a second language.

5. The method of claim 1, wherein at least one of the first mode of communication or the alternative mode of communication comprise audio communication.

6. The method of claim 1, wherein the command is a command for at least one of the one or more computing devices to relay a message to one or more other users.

7. The method of claim 6, further comprising:
   relaying, by at least one of the one or more computing devices, the message to the one or more other users;
   receiving a response to the message; and
   using the default communication mode to communicate the response to the user.

8. An apparatus for interacting with one or more computing devices, the apparatus comprising:
   one or more processors; and
   one or more memories operatively coupled to at least one of the one or more processors and having instructions stored thereon that, when executed by at least one of the one or more processors, cause at least one of the one or more processors to:
      receive a signal indicating the presence of a user;
      determine a default communication mode for communicating with the user, the default communication mode being determined by:
         using a first mode of communication to prompt the user to make a mode-selection gesture;
         if a mode-selection gesture is detected from the user, setting the first mode of communication as the default communication mode; and
         if no mode-selection gesture is detected, using an alternative mode of communication to prompt the user to make a mode-selection gesture;
      use the default communication mode to elicit a communicative gesture from the user;
      receive a signal identifying at least one communicative gesture from the user; and
      convert at least one of the identified communicative gestures into a command.

9. The apparatus of claim 8, wherein the default communication mode is based on the identity of the user.

10. The apparatus of claim 8, wherein
    the first mode of communication is set as the default communication mode if a mode-selection gesture is detected from the user within a threshold period of time; and
    wherein the alternative mode of communication is used to prompt the user to make a mode-selection gesture if no mode-selection gesture is detected within the threshold period of time.

11. The apparatus of claim 8, wherein the first mode of communication comprises a first language, and the alternative mode of communication comprises a second language.

12. The apparatus of claim 8, wherein at least one of the first mode of communication or the alternative mode of communication comprise audio communication.

13. The apparatus of claim 8, wherein the command is a command for at least one of the one or more computing devices to relay a message to one or more other users.

14. The apparatus of claim 13, wherein at least one of the one or more memories has further instructions stored thereon that, when executed by at least one of the one or more processors, cause at least one of the one or more processors to:
    relay the message to the one or more other users;
    receive a response to the message; and
    use the default communication mode to communicate the response to the user.

15. At least one non-transitory computer-readable medium storing computer-readable instructions that, when executed by one or more computing devices, cause at least one of the one or more computing devices to:
    receive a signal indicating the presence of a user;
    determine a default communication mode for communicating with the user, the default communication mode being determined by:
       using a first mode of communication to prompt the user to make a mode-selection gesture;
       if a mode-selection gesture is detected from the user, setting the first mode of communication as the default communication mode; and
       if no mode-selection gesture is detected, using an alternative mode of communication to prompt the user to make a mode-selection gesture;
    use the default communication mode to elicit a communicative gesture from the user;
    receive a signal identifying at least one communicative gesture from the user; and
    convert at least one of the identified communicative gestures into a command.

16. The at least one non-transitory computer-readable medium of claim 15, wherein the default communication mode is based on the identity of the user.

17. The at least one non-transitory computer-readable medium of claim 15, wherein
    the first mode of communication is set as the default communication mode if a mode-selection gesture is detected from the user within a threshold period of time; and
    wherein the alternative mode of communication is used to prompt the user to make a mode-selection gesture if no mode-selection gesture is detected within the threshold period of time.

18. The at least one non-transitory computer-readable medium of claim 15, wherein the first mode of communication comprises a first language, and the alternative mode of communication comprises a second language.

19. The at least one non-transitory computer-readable medium of claim 15, wherein at least one of the first mode of communication or the alternative mode of communication comprise audio communication.

20. The at least one non-transitory computer-readable medium of claim 15, wherein the command is a command for at least one of the one or more computing devices to relay a message to one or more other users.

21. The at least one non-transitory computer-readable medium of claim 20, further storing computer-readable instructions that, when executed by at least one of the one or more computing devices, cause at least one of the one or more computing devices to:
    relay the message to the one or more other users;
    receive a response to the message; and use the default communication mode to communicate the response to the user.

* * * * *